United States Patent [19]

Long et al.

[11] Patent Number: 4,575,469
[45] Date of Patent: * Mar. 11, 1986

[54] POLYMERIC-COATED FABRIC LAYER AND PRODUCT UTILIZING THE LAYER

[75] Inventors: Delmar D. Long, Rock Hill, S.C.; John F. Anderson, Jr., Springfield, Mo.

[*] Notice: The portion of the term of this patent subsequent to May 28, 2002, has been disclaimed.

[73] Assignee: Dayco Corporation, Dayton, Ohio

[21] Appl. No.: 718,626

[22] Filed: Apr. 1, 1985

Related U.S. Application Data

[62] Division of Ser. No. 482,365, Apr. 5, 1983, Pat. No. 4,520,038.

[51] Int. Cl.$^4$ ............................................. B32B 3/02
[52] U.S. Cl. ...................................... 428/86; 428/225; 428/257
[58] Field of Search .................... 428/86, 90, 225, 257

[56] References Cited

U.S. PATENT DOCUMENTS

| | | | |
|---|---|---|---|
| 3,527,654 | 9/1970 | Jones et al. | 428/319.7 |
| 3,862,291 | 1/1975 | Brandon et al. | 264/49 |
| 4,062,989 | 12/1977 | Long | 427/176 |
| 4,098,944 | 7/1978 | Pollock | 428/319.7 |
| 4,205,559 | 6/1980 | Long et al. | 428/260 |
| 4,282,051 | 8/1981 | Terpay | 428/90 |
| 4,418,106 | 11/1983 | Lander et al. | 428/90 |
| 4,439,473 | 3/1984 | Lippman | 428/90 |

Primary Examiner—James J. Bell
Attorney, Agent, or Firm—Joseph V. Tassone

[57] ABSTRACT

A polymeric-coated fabric layer, product using the layer, method and apparatus for making such layer and a method of making a belt construction comprising a polymeric belt body having a surface and a polymeric-coated fabric layer having an outer surface secured to the surface of the belt body are provided, the method of making a belt construction comprising the steps of providing a fabric layer having opposed sides, securing a main layer of polymeric material to one of the sides of the fabric layer, forming the main layer of polymeric material to have the outer surface facing away from the one side of the fabric layer, disposing the outer surface of the fabric layer against the surface of the belt body to provide an assembly thereof, bonding the outer surface of the layer to the surface of the belt body by a heat curing operation on the assembly, securing a gauge building layer of fibers to the one side of the fabric layer with another layer of polymeric material that is disposed on the one side before the layer of fibers is disposed thereon whereby the gauge building layer of fibers has a plurality of voids therein, and then filling the voids of the gauge building layer of fibers with the polymeric material of the main layer in a liquid form thereof to form the main layer.

5 Claims, 7 Drawing Figures

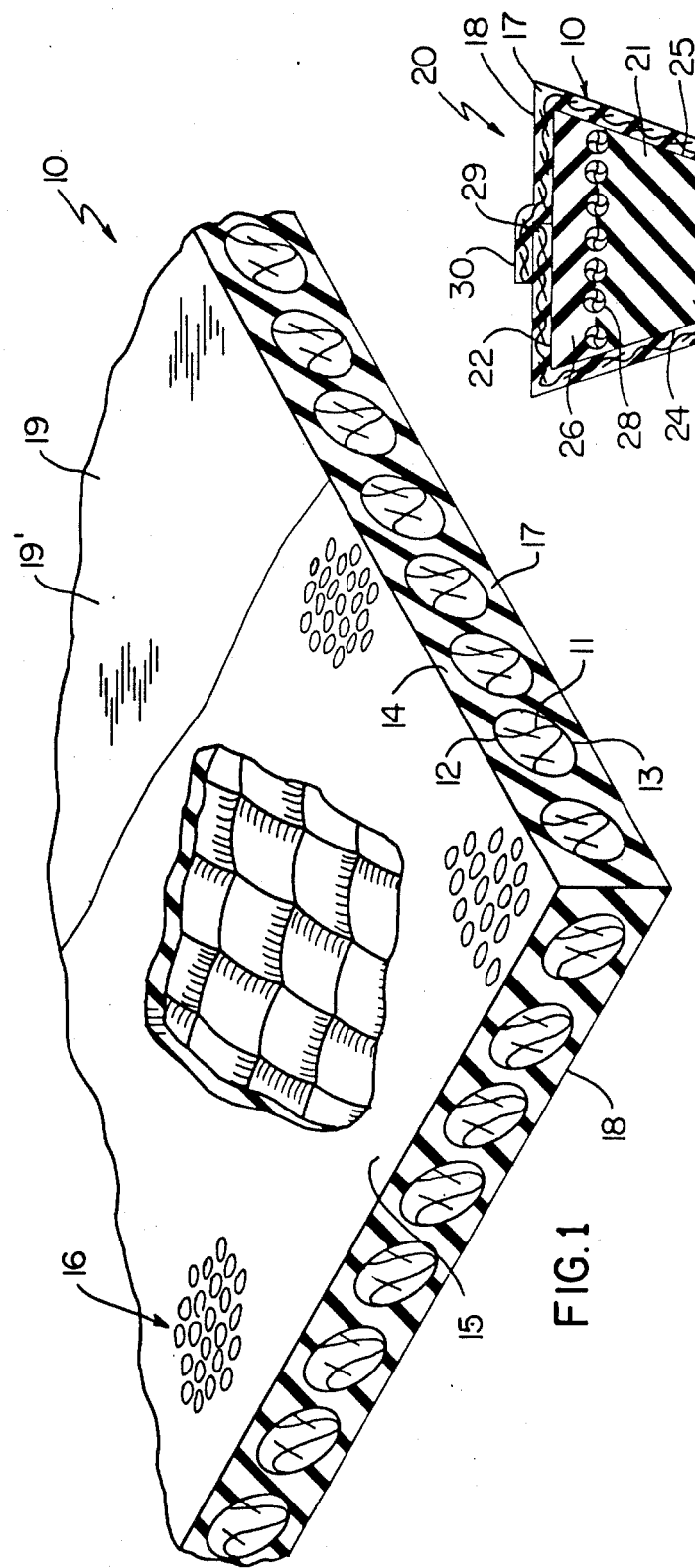
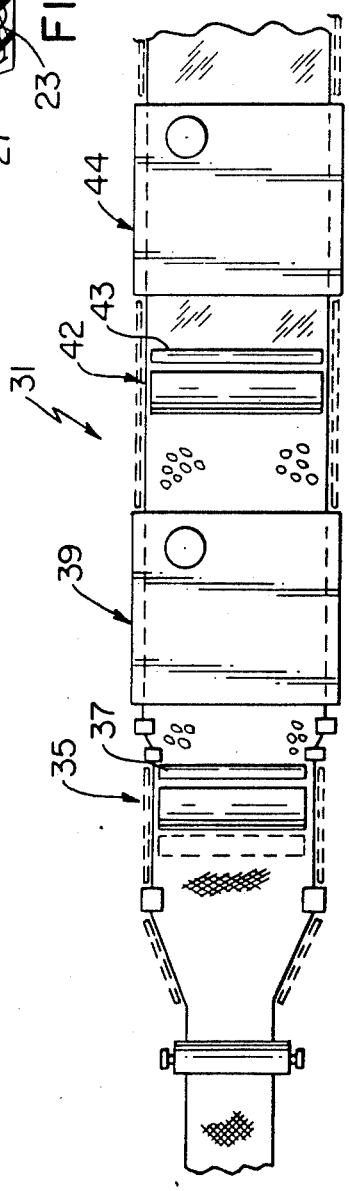

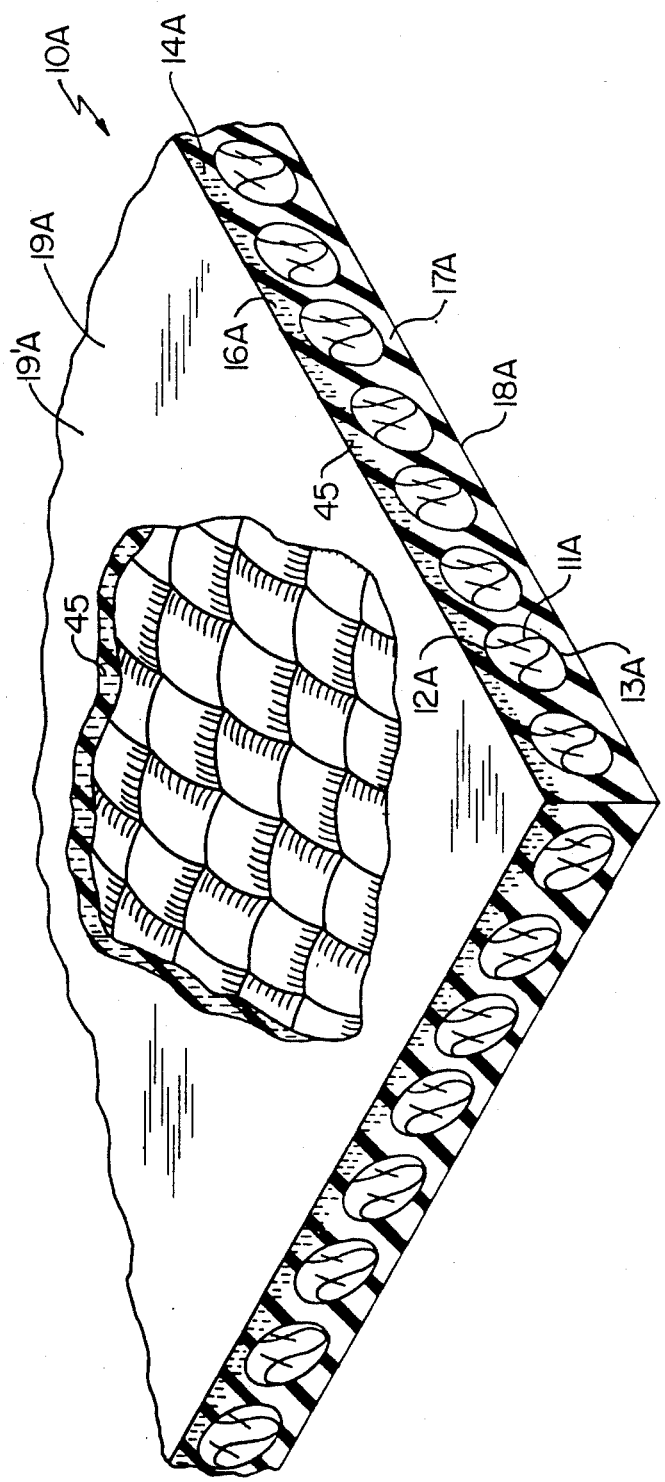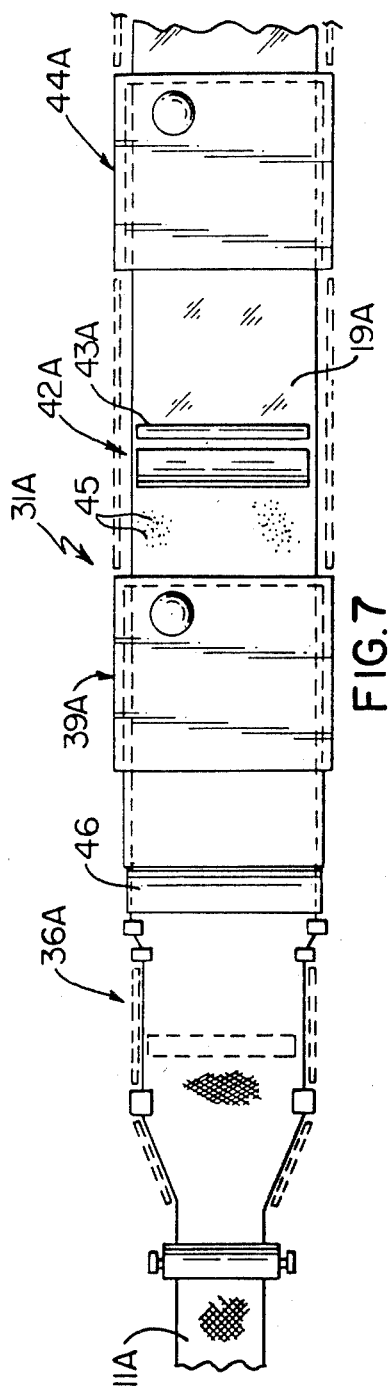

POLYMERIC-COATED FABRIC LAYER AND PRODUCT UTILIZING THE LAYER

CROSS REFERENCE TO RELATED APPLICATION

This application is a divisional patent application of its copending parent patent application, Ser. No. 482,365, filed Apr. 5, 1983 now U.S. Pat. No. 4,520,038.

BACKGROUND OF THE INVENTION

1. Field of the Invention

This invention relates to an improved polymeric-coated fabric layer means and a polymeric product utilizing such fabric layer means as well as to a method and apparatus for making such a fabric layer means.

2. Prior Art Statement

It is known in the art to provide a polymeric-coated fabric layer means comprising a fabric layer having opposed sides and a layer of polymeric material secured to one of the sides of the fabric layer and having an outer surface facing away from the fabric layer. For example, see the patent to Long, U.S. Pat. No. 4,062,989 and the patent to Long et al, U.S. Pat. No. 4,205,559.

It is also known to secure a foamed or foamable polymeric layer to one side of a fabric layer and to overcoat the outer surface of the foam layer with a polymeric layer. For example, see the patent to Jones et al, U.S. Pat. No. 3,527,654; the patent to Brandon et al, U.S. Pat. No. 3,862,291; and the patent to Pollock, U.S. Pat. No. 4,098,944.

It is also known to secure a layer of fibers to a fabric layer with a first layer of adhesive means and thereafter partially fill the voids in the fiber layer with a pressure sensitive adhesive, the fiber layer being oriented electrostatically. For example, see the patent to Terpay, U.S. Pat. No. 4,282,051.

SUMMARY OF THE INVENTION

It is one feature of this invention to provide an improved polymeric-coated fabric layer means, such as for being secured to a surface of an endless transmission belt construction and the like.

In particular, it is well known that the addition of polymeric material, such as rubber, to a given surface, such as a fabric layer, to build gauge is readily accomplished by the calendering process using dry rubber compounds. Producing a comparable structure by applying liquid polymeric coatings can be accomplished but only in multiple passes due in major part to the potential for the development of surface skin thereby causing one or both of two major problems, namely, blisters or interfacial film failure.

It is also well known that liquid polymeric compounds or solvents that have low viscosities (e.g.—less than 5,000 CPS) can release their serum without the formation of the surface skin. However, the problem of utilizing such compounds is to provide some means of encapsulating the compounds in an isolated manner in order to allow for such evaporation.

Accordingly, it is believed according to the teachings of this invention that such low viscosity polymeric compounds can be readily utilized for coating a fabric layer with the resulting product having sufficient gauge or thickness if a gauge building layer means of fibers is first secured to the fabric layer before the polymeric layer is secured thereto.

For example, one embodiment of this invention provides a method of making a belt construction comprising a polymeric belt body having a surface and a polymeric-coated fabric layer means having an outer surface secured to the surface of the belt body, the method comprising the steps of providing a fabric layer having opposed sides, securing a main layer of polymeric material to one of the sides of the fabric layer, forming the main layer of polymeric material to have the outer surface facing away from the one side of the fabric layer, disposing the outer surface of the layer means against the surface of the belt body to provide an assembly thereof, thereafter, bonding the outer surface of the layer means to the surface of the belt body by a heat curing operation on the assembly, securing a gauge building layer of fibers to the one side of the fabric layer with another layer of polymeric material that is disposed thereon whereby the gauge building layer of fibers has a plurality of voids therein, and then filling the voids of the gauge building layer of fibers with the polymeric material of the main layer in a liquid form thereof to form the main layer.

Accordingly, it is an object of this invention to provide an improved polymeric-coated fabric layer means having one or more of the novel features of this invention as set forth above or hereinafter shown or described.

Another object of this invention is to provide a method of making such a polymeric-coated fabric layer means, the method of this invention having one or more of the novel features of this invention as set forth above or hereinafter shown or described.

Another object of this invention is to provide an apparatus for making such a polymeric-coated fabric layer means, the apparatus of this invention having one or more of the novel features of this invention as set forth above or hereinafter shown or described.

Another object of this invention is to provide an improved product utilizing such a polymeric-coated fabric layer means, the product of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a broken away cross-sectional perspective view of the polymeric-coated fabric layer means of this invention.

FIG. 2 is a cross-sectional view of an endless power transmission belt construction or the like utilizing the layer means of this invention that is illustrated in FIG. 1.

FIG. 4 is a schematic, fragmentary, reduced top view of the apparatus of FIG. 3.

FIG. 5 is a view similar to FIG. 1 and illustrates another embodiment of the polymeric-coated fabric layer means of this invention.

FIG. 7 is a reduced, fragmentary, top view of the method and apparatus illustrated in FIG. 6.

DESCRIPTION OF THE PREFERRED EMBODIMENTS

Figure 3:
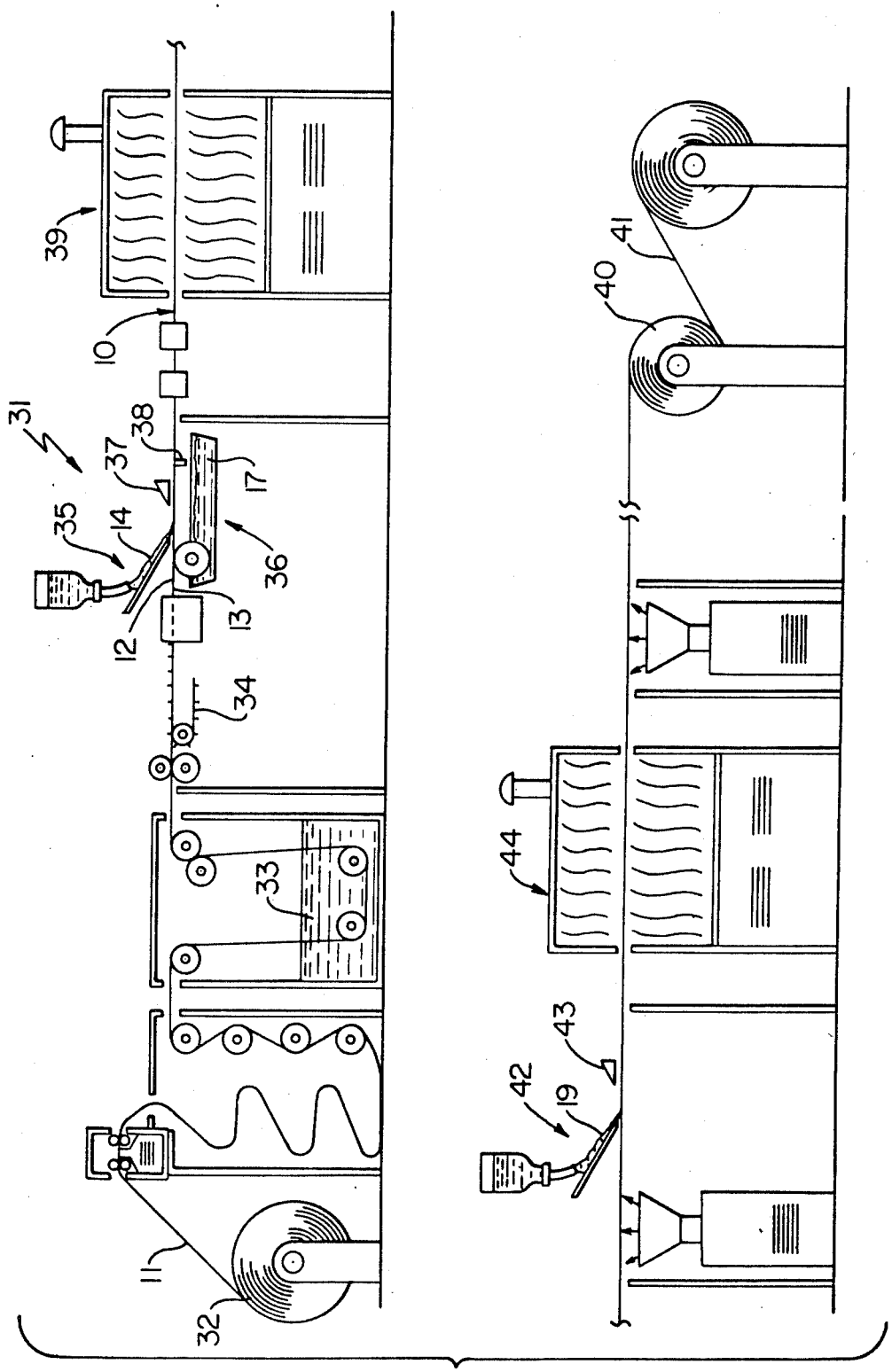
FIG. 3 is a schematic view illustrating the method and apparatus of this invention for making the polymeric-coated fabric layer means of FIG. 1.

While the various features of this invention are hereinafter illustrated and described as being particularly adapted to provide a polymeric-coated fabric layer means for making particular products, it is to be understood that the various features of this invention can be utilized singly or in various combinations thereof to provide a polymeric-coated fabric layer means for other uses and/or other products as desired.

Therefore, this invention is not to be limited to only the embodiments illustrated in the drawings, because the drawings are merely utilized to illustrate one of the wide variety of uses of this invention.

Referring now to FIG. 1, the improved polymeric-coated fabric layer means of this invention is generally indicated by the reference numeral 10 and comprises a suitable fabric layer 11 of a type well known in the art, such as a bias fabric layer, having opposed sides 12 and 13 and a layer 14 of gauge building material secured to the side 12 of the fabric layer 11 in a manner hereinafter set forth to define an outer substantially flat surface 15, the gauge building layer means 14 of this invention comprising a foamed polymeric layer, such as a foamed latex layer, which has an open cellular structure throughout the same as represented generally by the reference numeral 16 in FIG. 1. A polymeric layer 19 is subsequently secured to the side 12 of the fabric layer 11 by being overcoated on the gauge building layer 14 whereby the polymeric material fills the voids or openings 16 of the gauge building layer 14, such polymeric layer 19 being any suitable polymeric material such as a latex or the like. It is believed that such cellular structure 16 of the foamed polymeric layer 14 readily permits the layer 19 to initially have a relatively low viscosity and still be held in position by the gauge building layer 14 for subsequent drying thereof as will be apparent hereinafter and for the reasons previously set forth.

The layer 19 defines an outer surface 19' for the layer means 10 which is adapted to be secured to a surface of a polymeric product in a manner similar to other prior known polymeric-coated fabric layer means.

For example, see the copending patent application of Delmar D. Long, one of the co-inventors of this invention, Ser. No. 350,969, filed Feb. 22, 1982, wherein a tacky layer is provided for such securement purposes. Since this copending patent application describes the various uses of polymeric-coated fabric layer means and a method and apparatus for making the same which is similar to this invention as will be apparent hereinafter, this copending patent application is being incorporated into this disclosure by this reference thereto.

In addition, the aforementioned U.S. patents, U.S. Pat. No. 4,062,989 to Long and U.S. Pat. No. 4,205,559 to Long et al are also being incorporated into this disclosure by this reference thereto as such U.S. patents disclose other types of polymeric-coated fabric layer means for uses similar to the uses of the polymeric-coated fabric layer means 10 of this invention.

If desired, another layer 17 of polymeric material, such as a latex, can be secured to the other side 13 of the fabric layer 11 so as to define an outside surface 18 thereof which will subsequently provide an outside surface of the product utilizing such layer means 10.

However, it is to be understood that the polymeric layer 17 could have its surface 18 secured to the polymeric product while the surface 19' of the polymeric layer 19 defines the outside surface of the product utilizing the layer means 10 of this invention.

Also the particular surface of the layer means 10 that is to be secured to the polymeric product could be provided with the tacky layer of the aforementioned copending patent application, Ser. No. 350,969, filed Feb. 22, 1982 to enhance the securement therebetween.

For example, reference is now made to FIG. 2 wherein a product of this invention is generally indicated by the reference numeral 20 and comprises endless power transmission belt of a typical "V" type wherein the polymeric body 21 thereof has a substantially trapezoidal cross-sectional configuration defined by a pair of opposed flat parallel top and bottom surfaces 22 and 23 with a pair of angled side surfaces 24 and 25 disposed therebetween, the belt construction 20 having the conventional tension section 26, compression section 27 and load-carrying section 28 disposed intermediate the tension section 26 and compression section 27 in a manner well known in the art.

As is conventional in the art, the opposed angular surfaces 24 and 25 of the belt construction 20 are each adapted to have a friction layer, that comprises a fabric impregnated with a polymeric composition, secured thereon by such friction layer either being disposed only on the surfaces 24 and 25 thereof or by having the entire outside surface of the belt body 21 wrapped with the friction layer.

In any event, it can be seen that the belt construction 20 illustrated in FIG. 2 is completely wrapped by a strip of the polymeric-coated fabric layer means 10 of this invention so that the opposed ends 29 and 30 of the layer means 10 are disposed and secured in overlapping relation, such as on the top surface 22 of the belt construction 20 as illustrated in FIG. 2 and is conventional in the belt making art.

When utilizing the layer means 10 of this invention for forming the belt construction 20 of FIG. 2, it can be seen that either the side 18 or the side 19' thereof can be disposed in contact with the outer surfaces 22, 23, 24 and 25 of the polymeric body 21 of the belt construction 20 so as to readily conform to such surfaces 22, 23, 24 and 25 during a subsequent heat curing or vulcanizing of the belt construction 20 after the layer means 10 has been wrapped on the belt body 21 in a manner well known in the art of making belt constructions.

However, it is believed that by utilizing the foamed layer 14 of this invention with the overcoating 19 for being secured to the surfaces 22, 23, 24 and 25 of the belt body 21, excellent adhesion will be provided between the layer 19 and the belt body 21 during the subsequent vulcanizing or curing operation of the belt construction 20 since the cellular construction 16 of the foamed layer 14 readily permits the layer 19 to conform to the surfaces 22, 23, 24, and 25 of the belt body 21 not only during the wrapping of the layer means 10 against the belt body 21, but also during the subsequent heat curing and vulcanizing operation, such feature is being disclosed and claimed in applicants' copending patent application, Ser. No. 482,363, filed Apr. 5, 1983 whereby such copending patent application is being incorporated into this application by this reference thereto.

As illustrated in FIG. 2, the outer surface 18 of the layer 17 provides the contact facing of the belt construction 20 at the driving or driven sides 24 and 25 thereof as is conventional in the art.

While the layer means 10 of this invention has been previously described as forming an outside surface of a belt product, it is to be understood that the layer means 10 of this invention can provide not only an outside surface thereof but also in addition thereto or in lieu thereof could form part of an inner layer of the belt product if desired. In fact, the layer 17 could also be a foamed polymeric layer in a manner similar to the layer 14 so as to provide gauge building means on the side 13 of the fabric layer 11, if desired.

Also, while the layer means 10 of this invention has been previously described as forming a part or parts of a belt construction or the like, it is to be understood that there are other products that can utilize the layer means 10 of this invention. For example, the layer means 10 can provide part of a printing blanket, part of a hose construction as well as be utilized for making the entire hose construction, gasket means, etc., whereby it can be seen that the layer means 10 of this invention can be utilized as a product itself or with other products not disclosed in this application because it is believed that the same is readily adapted to be utilized where any such polymeric-coated fabric layer means is presently being used or where such polymeric-coated fabric layer means could possibly be used.

While the layer means 10 of this invention is hereinafter illustrated and described as being formed by a particular method and apparatus as illustrated in FIGS. 3 and 4, it is to be understood that this invention is not to be limited to the specific method and apparatus illustrated in FIGS. 3 and 4 as the same is merely being disclosed as a believed to be possible method and apparatus for making the layer means 10 of this invention.

Therefore, reference is now made to FIGS. 3 and 4 wherein a method and apparatus of this invention for forming the layer means 10 of FIG. 1 is generally indicated by the reference numeral 31 and will now be described.

As illustrated in FIG. 3, the fabric layer 11 is fed from a supply roll 32 thereof through a liquid 33 that impregnates and lubricates the threads thereof so that the same can be readily stretched on a tenter frame 34 in a direction transverse to the longitudinal direction of the fabric sheet 11. Thereafter, the foamed polymeric material 14 in liquid form is applied to the top surface 12 of the fabric sheet 11 while simultaneously the polymeric material 17 in liquid form is being applied to the bottom surface 13 of the fabric sheet 11 by respective coating means that are generally indicated by the reference numerals 35 and 36 in FIG. 3, such liquid materials 14 and 17 being respectively doctored by suitable doctor means 37 and 38 disposed on opposite sides of the now coated fabric sheet 11 to produce the coated fabric layer means of this invention that is generally indicated by the reference numeral 10 in FIG. 3. The coatings 14 and 17 are sufficiently liquid to impregnate the fiber bundles of the fabric layer 11 so as to provide good adhesion of the layers 14 and 17 to the fabric layer 11.

The coated sheet 11 is now passed through a heating means that is generally indicated by the reference numeral 39 for substantially drying the coatings 14 and 17 without curing the same.

The method and apparatus 31 of this invention is also adapted to provide the overcoat 19 on the gauge building layer means 14 of the polymeric coated fabric layer means 10, if desired. For example, such overcoating 19 can be applied in liquid form by a suitable applicator means that is generally indicated by the reference numeral 42 in FIG. 3 and can be doctored by suitable doctor means 43 which either provides a thickness to the overcoating 19 above the entire surface 15 of the foamed layer 14 or merely causes the coating 19 to just fill the openings 16 in the side 15 of the foamed layer 14, as desired.

After the overcoating 19 is applied to the side 15 of the foamed layer 14, the polymeric-coated fabric layer means 10 is passed through a heating means 44 which substantially dries the overcoating 19 without curing the layers 14, 17 and 19 before the polymeric coated fabric layer means 10 of this invention is wound into a supply roll 40 thereof with a sheet 41 wound therewith to prevent the wound polymeric-coated fabric layer means 10 of this invention from securing to itself in the roll 40 as is well known in the art.

Therefore, it can be seen that when it is desired to utilize the layer means 10 of this invention, a sufficient quantity thereof can be dispensed from the supply roll 40 thereof to be utilized either by itself when subsequently heat cured or remaining uncured or in combination with a polymeric product, such as by forming the belt construction 20 in the manner previously described, whereby it can be seen that this invention provides an improved polymeric-coated fabric layer means 10 that comprises a fabric layer 11 having opposed sides 12 and 13, a layer of polymeric material 19 secured to the side 12 of the fabric layer 11 and having an outer surface 19' facing away from the fabric layer 11, and a gauge building layer means 14 having been secured to the one side 12 of the fabric layer 11 before the polymeric layer 19 is secured thereto, the gauge building layer means 14 having a plurality of voids 16 therein filled with the polymeric layer 19.

Figure 6:
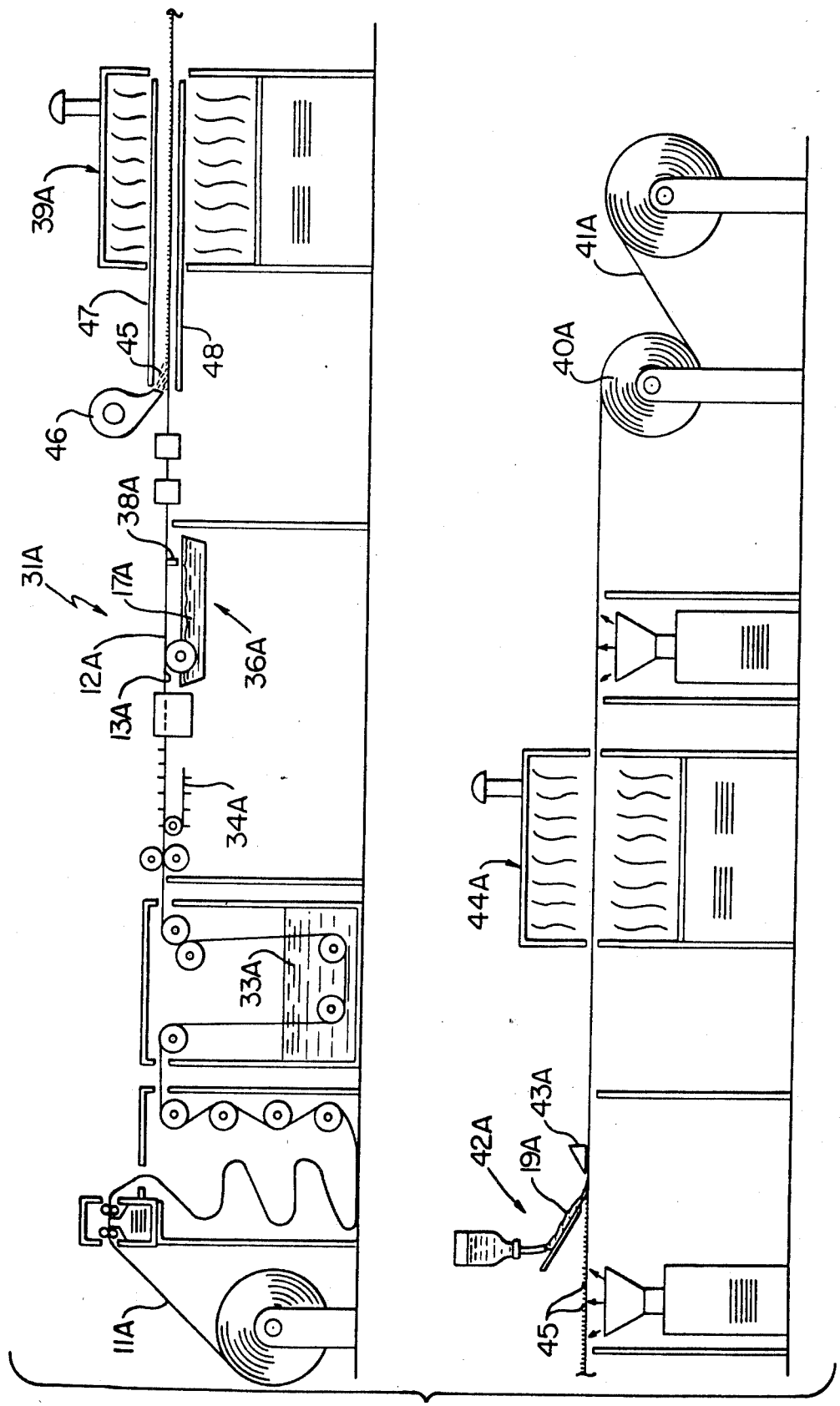
FIG. 6 is a view similar to FIG. 3 and illustrates another embodiment of the method and apparatus of this invention for forming the polymeric-coated fabric layer means illustrated in FIG. 5.

Another improved polymeric-coated fabric layer means of this invention is generally indicated by the reference numeral 10A in FIGS. 5–7 and parts thereof similar to the layer means 10 previously described are indicated by like reference numerals followed by the reference letter "A".

As illustrated in FIG. 5, the layer means 10A comprises the fabric layer 11A having opposed sides 12A and 13A with the side 12A having a gauge building layer means that is generally indicated by the reference numeral 14A secured thereto in a manner hereinafter set forth and a polymeric layer 19A filling the voids 16A in the gauge building layer means 14A in a manner hereinafter set forth to define one of the opposed sides 19'A of the layer means 10A. In addition, the layer means 17A can be secured to the other side 13A of the fabric layer 11A to define the other opposed side 18A of the layer means 10A.

The gauge building layer means 14A of this invention comprises a plurality of elongated fibers 45 that have the long dimensions thereof oriented so as to be disposed substantially transverse to side 12A of the fabric layer 11A in order to provide thickness to the gauge building layer means 14A and define the voids 16A therebetween which are filled by the polymeric material or layer 19A in a manner hereinafter set forth, the polymeric material 19A being adapted to have a low viscosity as the gauge building layer means 14A will hold the polymeric material 19A in place during a subsequent drying thereof.

While the fibers 45 can comprise any suitable fibers, such as conventional reinforcing fibers for polymeric material, the same can be of a material which readily permits the same to be electrostatically flocked in an oriented manner onto the surface 12A of the fabric layer 11A in order to be secured thereto in an upstanding manner to provide the thickness or gauge for the gauge building layer 14A.

For example, reference is now made to FIGS. 6 and 7 wherein the method and apparatus of this invention for forming the layer means 10A is generally indicated by the reference numeral 31A and parts thereof similar to the apparatus 31 of FIGS. 3 and 4 previously described are indicated by like reference numerals followed by the reference letter "A".

As illustrated in FIG. 6, after the fabric layer 11A has been transversely stretched by the tenter frame 34A, the liquid coating 17A is applied to the side 13A thereof by the applicator means 36A which is doctored by the doctor means 38A in the manner previously described.

It is believed that the side 12A of the fabric layer 11A will now have sufficient liquid polymeric material thereof which is provided by the coating means 17A impregnating and exuding through the fabric layer 11A as well as provided by the bath 33A so that the fiber means 45 will adhere thereto when the same engage the side 12A of the fabric layer 11A.

In particular, it is believed that the fibers 45 can be supplied by a unit 46 that blows the fibers 45 between a pair of electrically and oppositely charged plates 47 and 48 that are disposed on opposite sides of the fabric layer 11A and that create an electrostatic field therebetween in a manner well known in the art to cause the particles 45 to align with their long dimensions extending between the plates 47 and 48 so that when the same fall by gravity and contact the surface 12A of the fabric sheet 11A, the fibers 45 are disposed with their long dimensions substantially transverse thereto and will be adapted to be secured thereto in the upstanding oriented manner as illustrated in FIG. 6 as long as the same are disposd in the electrostatic field created between the plates 47 and 48. Thus, the fabric layer 11A with the fibers 45A being held in their oriented condition by the electrostatic field is carried through the heating means 39A to cause the heating means 39A to sufficiently dry the layer 17A without curing thereof as well as set the polymeric material on the side 12A of the fabric layer 11A to cause the fibers 45 to remain secured in the upstanding arrangement when the same pass out from beneath the plates 47 and 48 and thereby are no longer influenced by the electrostatic field thereof.

In this manner, the plates 47 and 48 can extend into the heating means 39A a sufficient distance to permit the setting up of the polymeric material on the side 12A of the fabric layer 11A to sufficiently hold the fibers 45 in their oriented and upstanding condition.

Thereafter, the layer 11A has the voids 16A between the fibers 45 filled by the liquid polymeric material 19 being fed or coated onto the side 12A of the fabric layer 11A by the applicator means 42A with the material 19A being subsequently doctored by the doctor means 43A so that the voids 16A in the gauge building layer means 14A will have been completely filled by the polymeric material 19A to define the side 19'A of the layer means 10A.

As illustrated in FIG. 6, the coating 19A that now fills the voids 16A between the fibers 45 is sufficiently dried without curing of the layers 17A and 19A as the layer means 10A passes through the heating means 44A so that the layer means 10A can be wound into the supply roll 40A thereof with or without the interleaving strip 41A to prevent sticking together of the coils of the layer means 10A in the supply roll 40A.

The completed layer means 10A of this invention can be utilized in the same manner and for the same purpose as the layer means 10 previously described and therefore a further description of the use of the layer means 10A is unnecessary.

Accordingly, it can be seen that this invention provides a polymeric-coated fabric layer means 10 or 10A comprising a fabric layer 11 or 11A having opposed sides 12, 13 or 12A, 13A, a layer 19 or 19A of polymeric material secured to one of the sides of the fabric layer and having an outer surface 19' or 19'A facing away from the one side of the fabric layer, and a gauge building layer means 14 or 14A secured to the one side of the fabric layer 11 or 11A before the polymeric layer 19 or 19A is secured thereto, the gauge building layer means 14 or 14A having a plurality of voids 16 or 16A therein with the polymeric layer 19 or 19A filling the voids 16 or 16A of the gauge building layer means 14 or 14A.

While the layer means 10 and 10A has each been illustrated and described as having only one gauge building layer means 14 or 14A disposed thereon, it is to be understood that one or more layer means 14 or 14A or combinations thereof can be provided in stacked relation with or without the voids 16 or 16A in any particular layer means 14 or 14A being filled with polymeric material. For example, the layers could be stacked to provide a foamed layer 14 and then a flocked layer 14A that is filled with polymeric material 19A; a foamed layer 14, then a flocked layer 14A and then a foamed layer 14 that is filled with polymeric material 19; a flocked layer 14A and then a foamed layer 14 that is filled with polymeric material 19; etc. whereby each combination will provide a polymeric-coated fabric layer means that has different characteristics.

Accordingly, it can be seen that this invention not only provides an improved polymeric-coated fabric layer means and method and apparatus for making the same, but also this invention provides an improved product utilizing such a layer means.

While the forms and methods of this invention now preferred have been illustrated and described as required by the Patent Statute, it is to be understood that other forms and method steps can be utilized and still fall within the scope of the appended claims.

What is claimed is:

1. In a belt construction comprising a polymeric belt body having a surface and a polymeric-coated fabric layer means having an outer surface secured to said surface of said belt body, said fabric layer means comprising a fabric layer having opposed sides and a main layer of polymeric material secured to one of said sides of said fabric layer and having an outer surface facing away from said one side of said fabric layer, said outer surface of said layer means being disposed against said surface of said belt body to provide an assembly thereof and having been bonded to said surface of said belt body by a heat curing operation on said assembly, the improvement comprising a gauge building layer of fibers secured to said one side of said fabric layer with another layer of polymeric material that was disposed on said one side before said layer of fibers was disposed thereon whereby said gauge building layer of fibers has a plurality of voids therein, said voids of said gauge building layer of fibers having been filled with said polymeric material of said main layer in a liquid form thereof to form said main layer.

2. A belt construction as set forth in claim 1 wherein said fibers are oriented relative to said fabric layer so that the long dimensions of said fibers are generally transverse to said fabric layer.

3. A belt construction as set forth in claim 2 wherein said fibers had been oriented with an electrostatic field means.

4. A belt construction as set forth in claim 1 wherein said polymeric material of said main layer in said liquid form thereof has a relatively low viscosity.

5. A belt construction as set forth in claim 4 wherein said viscosity is less than approximately 5,000 CPS.

* * * * *